Sept. 22, 1964     H. O. MONSON ETAL     3,150,057
FUEL SUBASSEMBLY FOR NUCLEAR REACTOR
Filed May 29, 1962     3 Sheets-Sheet 1
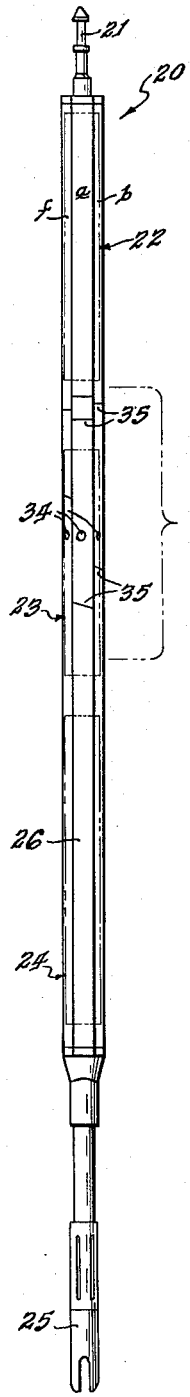
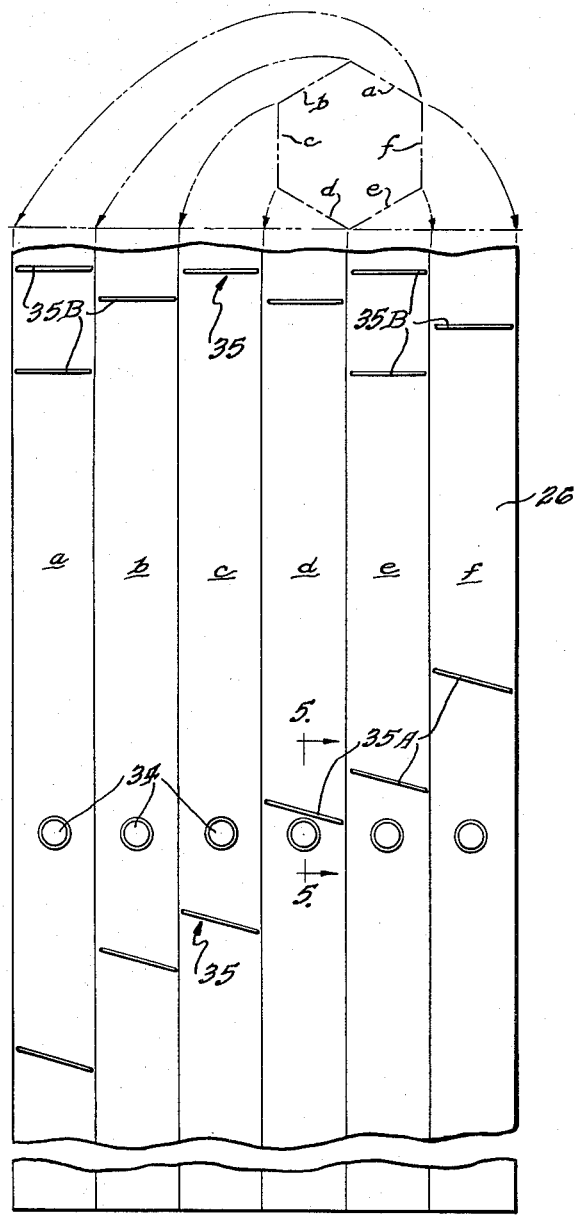
INVENTORS
Harry O. Monson
Ernest Hutter
BY
Roland A. Anderson
Attorney Sept. 22, 1964     H. O. MONSON ETAL     3,150,057
FUEL SUBASSEMBLY FOR NUCLEAR REACTOR
Filed May 29, 1962     3 Sheets-Sheet 2
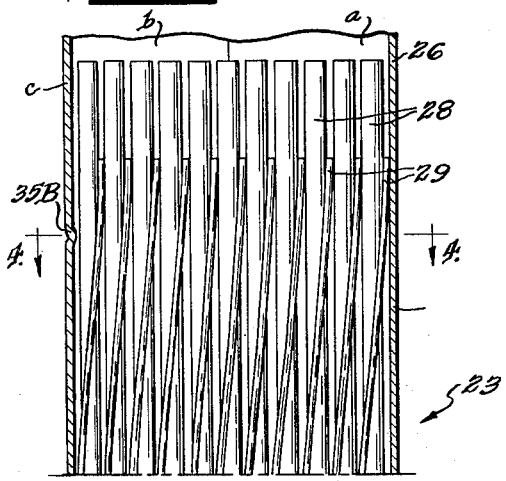
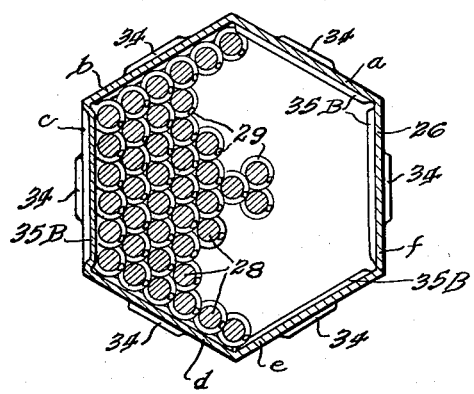
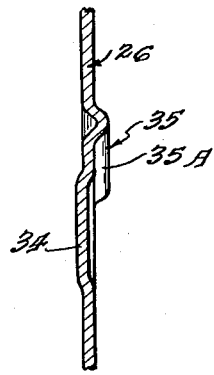
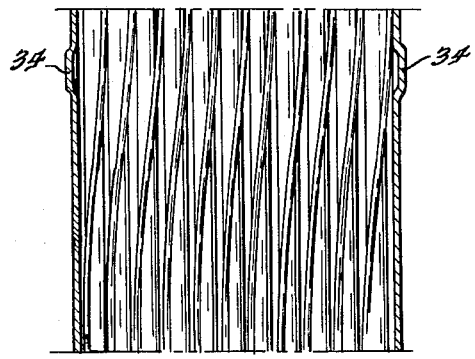
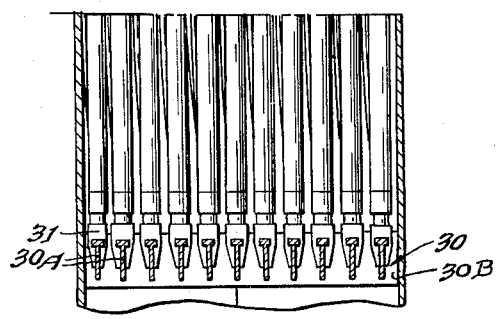
INVENTORS
Harry O. Monson
Ernest Hutter
BY
Roland A. Anderson
Attorney

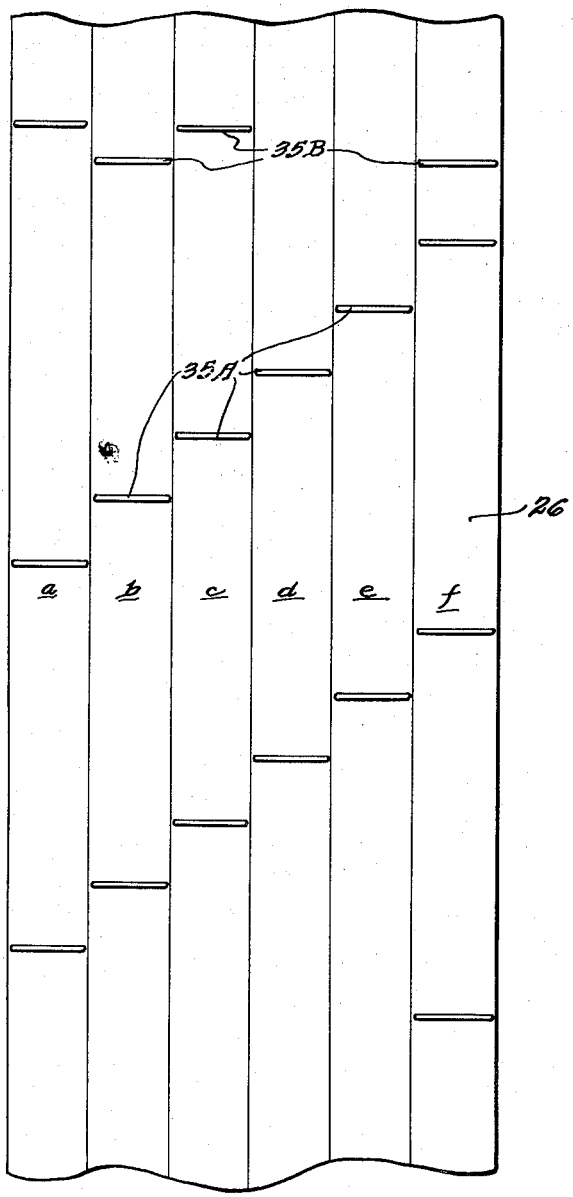

United States Patent Office 3,150,057
Patented Sept. 22, 1964

3,150,057
FUEL SUBASSEMBLY FOR NUCLEAR REACTOR
Harry O. Monson, Elmhurst, and Ernest Hutter, Chicago, Ill., assignors to the United States of America as represented by the United States Atomic Energy Commission
Filed May 29, 1962, Ser. No. 198,658
5 Claims. (Cl. 176—78)

This invention relates to a fuel subassembly for a nuclear reactor. In more detail the invention relates to a fuel subassembly including a bundle of fuel rods and incorporating means for restraining the fuel rods from bowing. The invention finds particular utility in connection with a fuel subassembly for a sodium-cooled fast breeder reactor.

Power producing nuclear reactors which are designed to transform breeder materials into fissionable isotopes usable to refuel the reactor are especially desirable for commercial use. Their potential widespread use requires, of course, maximum effort to reduce potential hazards which may cause unsafe operation.

Fast breeder reactors such as the Experimental Breeder Reactor II employ fuel elements in the form of a tight bundle of slender fuel rods through which a liquid metal is passed as coolant. Since this is a fast reactor operating at a high temperature, a slight movement in the core may result in changing the reactivity of the reactor and in varying the size of some of the coolant channels.

Patent No. 2,961,393 discloses a complete fast breeder reactor and describes certain of the hazards appertaining thereto.

Another hazard arises from the particular physical structure of the fuel elements for such a reactor. These fuel elements include a fuel subassembly consisting of a bundle of tightly spaced, slender, elongated fuel rods within a hexagonal, metallic tube. Each rod has a helical, spacer rib wrapped around it. To ensure uniformity throughout the fuel element, all of the helical ribs have the same pitch and the same orientation. It is to be noted therefore that the outermost elements do not have any support to hold them away from the hexagonal tube between turns of the helical ribs.

It is known that due to this construction there is danger that the fuel rods will bow outwardly in these unsupported places due to a combination of hydraulic pressure and the large temperature differences characteristic of such a reactor. This bowing creates two possible causes for instability; the change in fuel position in the fuel subassembly may change the reactivity and the change in size of certain of the coolant channels may result in localized heating in the fuel element.

The simplest solution to the problem would be to reduce the pitch of the helical ribs. This cannot be done. Because the spacing of the fuel rods is so close, a substantial reduction in the pitch of the helical ribs would impede the flow of fluid. Therefore excessive pumping power would be required and there would be too great a drop in pressure; also natural convective cooling would be more difficult. We have developed specific means for solving this problem which do not impede the flow of coolant. It will be appreciated that the invention is applicable to fuel elements for other types of reactors as well as fast breeder reactors although it is described specifically as applied to a fast breeder reactor.

It is accordingly an object of the present invention to provide means for preventing bowing of the fuel rods in a fuel subassembly for a fast breeder nuclear reactor.

It is another object of the present invention to provide such means while interfering as little as possible with assembly and disassembly of the subassembly.

The invention will next be described in connection with the accompanying drawings wherein:

FIG. 1 is a side view of a fuel subassembly for a nuclear reactor incorporating the present invention.

FIG. 2 is a developed view of the hexagonal tube in that portion of FIG. 1 indicated by the bracket, the expansion being made only for purposes of illustration.

FIG. 3 is a vertical cross-section view through the fuel zone of the fuel subassembly.

FIG. 4 is a horizontal cross-sectional view taken in the direction of the arrows 4—4 in FIG. 3.

FIG. 5 is a partial vertical cross-sectional view taken in the direction of the arrows 5—5 in FIG. 2.

FIG. 6 is a developed view illustrating a modified form of the invention.

Referring now to FIGS. 1 to 5 of the drawing, a fuel subassembly 20 for a fast breeder reactor comprises a handling member 21, an upper blanket 22, a fuel zone 23, a lower blanket 24, and an adapter 25. An outer hexagonal tube 26 encloses the fuel and blanket zones of the assembly.

A bundle 27 of slender elongated cylindrical fuel rods 28 (shown in FIGS. 3 and 4) is disposed in hexagonal tube 26 within fuel zone 23. Each of the fuel rods 28 has a single, helical spacer rib 29 of uniform depth on the exterior thereof, the helical ribs on all of the fuel rods 28 within a fuel bundle 27 having the same pitch, depth and orientation. Fuel rods 28 are supported at their lower end from a fuel element support grid 30 made up of parallel strips 30A fitting transversely across the hexagonal tube 26 and welded thereto. Strips 30A are connected by strips 30B. Fuel rods 28 have thin flat tips 31 at the lower end thereof which fit in slots in strips 30A thereby establishing the proper orientation of helical ribs 29.

For descriptive purposes each face of the hexagonal tube 26 has been given a letter designation—$a$, $b$, $c$, $d$, $e$, and $f$. Spacer buttons 34 are provided on each of these faces.

Hexagonal tube 26 is 64$^{23}\!/_{32}$ inches long and the distance across flats is 2.21 inches. Bundle 27 contains 91 fuel rods 28 each of which is 18 inches long and 0.174 inch in diameter. Helical ribs 29 are 0.049 inch in depth and have a pitch of six inches.

It will be appreciated that the fuel subassembly thus far described is conventional in nature. According to the present invention, integral internal ribs 35 are provided extending across the faces of hexagonal tube 26 within the fuel zone 23 to minimize bowing of the fuel rods 28. The specific arrangement, location and depth of internal ribs 35 form a very important part of the present invention and will be discussed in detail hereinafter.

Internal ribs 35 are of two types. Internal ribs 35A of type A extend slantingly at an angle of 15° to a plane perpendicular to the axis of the subassembly across the faces of the hexagonal tube 26 at a location substantially below the top of the fuel rods. There is one rib 35A extending across each face of the hexagonal tube 26 making a total of six such ribs. These ribs 35A have a depth of 0.02 inch which is slightly less than one-half the depth of helical ribs 29. Internal ribs 35A are longitudinally spaced at staggered intervals, the following table giving the distance between the bottom of the hexagonal tube 26 and the midpoint of ribs 35A.

| | Inches |
|---|---|
| Rib 35A on face $a$ | 28.80 |
| Rib 35A on face $b$ | 30.40 |
| Rib 35A on face $c$ | 31.00 |
| Rib 35A on face $d$ | 32.70 |
| Rib 35A on face $e$ | 33.20 |
| Rib 35A on face $f$ | 34.80 |

Internal ribs 35B of type B extend across the faces of the hexagonal tube 26 near the top of the fuel zone 23 in a plane perpendicular to the subassembly. Ribs 35B are 0.048 inch in depth, or approximately the same depth as are the helical ribs 29. There are a total of eight internal ribs 35B located as follows. There are two ribs 35B located on each of faces a and e at a distance of 39 13/16 inches and 41 5/32 inches respectively from the bottom of hexagonal tube 26; there is one rib 35B located on each of faces b and d at a distance of 40 11/16 inches from the bottom of hexagonal tube 26; there is one rib 35B located on face c at a distance of 41 5/32 inches from the bottom of tube 26; and there is one rib 35B located on face f at a distance of 40 5/16 inches from the bottom of tube 26.

In assembling the fuel subassembly 20, the lower blanket 24 and the fuel element support grid 30 are preassembled. The fuel rods 28 are then individually placed in the grid, tips 31 ensuring that all fuel rods are arranged with the same angular orientation. The hexagonal tube 26 which already contains the upper blanket 22 is then lowered over the fuel rods 28. Proper angular orientation of the hexagonal tube 26 with respect to the arrangement of the helical ribs 29 on the fuel rods 28 is obtained by observation of markings on the hexagonal tube and the grid 30.

After the fuel element bundle 27 enters the hexagonal tube 26, helical ribs 29 on the fuel rods 28 contact the internal ribs 35A. Since ribs 35A are only approximately one-half as deep as are helical ribs 29 and the fuel rods 28 are slightly flexible, the internal rib will pass over the helical rib with only a limited amount of resistance from friction. To aid in this operation, internal ribs 25A are slanted and the distance between them is staggered. Since ribs 35A are different distances apart, helical ribs 29 on the outside fuel rods 28 of the fuel bundle 27 do not strike against all of the ribs 35A at the same time. Thus a slight pressure gets the fuel bundle 27 by one rib 35A and then after the pressure starts to ease from this cause another slight pressure gets another rib 35A past the helical ribs 29.

As has been stated, ribs 35A are slanted at an angle of 15°. The purpose of the slant is also to make it easier to insert the fuel bundle 27 in the tube 26. Each face of the fuel bundle 27 is six fuel rods 28 across. Since internal ribs 35A are slanting they do not contact the helical ribs 29 on all of these fuel rods 28 at the same time when hexagonal tube 26 is lowered over the fuel bundle 27.

By these two expedients the amount of friction resulting from passing ribs 35A over ribs 29 when assembling the fuel subassembly is minimized. When the fuel bundle 27 is in place within the hexagonal tube 26 ribs 35A are provided at locations on the various faces of the hexagonal tube 26 where the helical ribs 29 are on the opposite side of the fuel rods 28 from the adjacent face of the hexagonal tube. These ribs 35A minimize outward bowing of the fuel rods 28 at these points.

Ribs 35B are for the purpose of preventing movement of the fuel rods 28 near the top of the fuel zone 23. It will be appreciated that the bottom of the fuel rods 28 is fixed by the grid 30 but that the upper ends thereof are unrestrained. Ribs 35B prevent lateral movement of the fuel elements near the top thereof. Since ribs 35B need not pass over helical ribs 29, they can be and are of approximately the same depth as are the helical ribs and they can and do extend diametrically across the faces of the hexagonal tube 26. The specific number and location of these ribs 35B is not critical but the location and number shown is the optimum arrangement for the specific fuel subassembly 20 described.

Another embodiment of the invention is shown in FIG. 6. This embodiment of the invention also employs two types of internal ribs 35 extending across the faces of the tube 26. The ribs 35A of type A are also 0.20 inch in depth but they extend across the faces of the hexagonal tube in a plane perpendicular to the axis of the subassembly and they are longitudinally spaced at one inch intervals between turns of the helical rib 29. As shown in the drawings there are thirteen of these ribs 35A. Minimization of bowing is as efficient in this embodiment of the invention as in the first embodiment of the invention but assembly of the subassembly is more difficult. Ribs 35B are of about the same depth and perform the same function in this embodiment of the invention as in the first-mentioned embodiment of the invention.

It will be understood that the invention is not to be limited to the details given herein but that it may be modified within the scope of the appended claims.

What is claimed is:

1. A fuel subassembly for a nuclear reactor comprising an elongated, hexagonal, metallic tube, a bundle of slender, elongated fuel rods disposed in triangular array in said hexagonal tube, a single, helical spacer rib on each of said fuel rods, each spacer rib having the same pitch, depth and orientation, at least one lower internal rib extending across each of the faces of the hexagonal tube at a location substantially below the top of the fuel rods where the helical ribs are oriented away from the said faces and a plurality of upper internal ribs extending across at least some of the faces of the hexagonal tube near the top of the fuel rods in the subassembly, the lower internal ribs being slightly less than half the depth of the helical ribs and the upper internal ribs being approximately the same depth as the helical ribs.

2. A fuel subassembly according to claim 1 wherein the said lower internal ribs are longitudinally spaced at equidistant intervals at the midpoint between turns of the helical ribs in a plane perpendicular to the axis of the subassembly.

3. A fuel subassembly according to claim 2 wherein the pitch of the helical ribs is six inches and there are thirteen of the said lower internal ribs disposed at one-inch intervals, and wherein there are four of the said upper internal ribs each located on a different face of the hexagonal tube.

4. A fuel subassembly according to claim 1 wherein said lower internal ribs extend across the faces of the hexagonal tube at a slight angle to a plane perpendicular to the axis of the subassembly and are longitudinally spaced at staggered intervals.

5. A fuel subassembly according to claim 4 wherein there are six of the said lower internal ribs disposed at an angle of 15° to a plane perpendicular to the axis of the subassembly and there are eight of the upper internal ribs extending across the faces of the hexagonal tube in a plane perpendicular to the axis of the subassembly.

References Cited in the file of this patent

UNITED STATES PATENTS 2,961,393    Monson _____ Nov. 22, 1960
2,977,297    Evans et al. _____ Mar. 28, 1961

OTHER REFERENCES

NAA-SR-6879, Stabilizing SRE Fuel Elements, Apr. 15, 1962, pages 1-6.